(12) United States Patent
Yasuda

(10) Patent No.: US 7,837,004 B2
(45) Date of Patent: Nov. 23, 2010

(54) STEERING ASSISTING SYSTEM FOR VEHICLE

(75) Inventor: Akio Yasuda, Kosai (JP)

(73) Assignee: Denso Corporation, Kariya (JP)

( * ) Notice: Subject to any disclaimer, the term of this patent is extended or adjusted under 35 U.S.C. 154(b) by 152 days.

(21) Appl. No.: 12/172,498

(22) Filed: Jul. 14, 2008

(65) Prior Publication Data

US 2009/0032327 A1 Feb. 5, 2009

(30) Foreign Application Priority Data

Aug. 2, 2007 (JP) ............................. 2007-201630

(51) Int. Cl.
*B62D 5/04* (2006.01)
(52) U.S. Cl. .................. 180/446; 180/443; 180/402; 180/407
(58) Field of Classification Search ................ 180/446, 180/443, 402, 407
See application file for complete search history.

(56) References Cited

U.S. PATENT DOCUMENTS

| 6,705,424 | B2 * | 3/2004 | Ogawa et al. ............... 180/446 |
|---|---|---|---|
| 6,782,968 | B2 * | 8/2004 | Sakugawa .................... 180/446 |
| 6,820,715 | B2 | 11/2004 | Laurent et al. | |
| 6,896,091 | B2 * | 5/2005 | Kojo et al. ................... 180/402 |
| 6,931,313 | B2 * | 8/2005 | Kato et al. ..................... 701/41 |
| 7,203,582 | B2 * | 4/2007 | Yokota ........................ 701/41 |
| 2003/0168275 | A1 * | 9/2003 | Sakugawa .................... 180/402 |
| 2003/0201136 | A1 | 10/2003 | Ueno et al. | |
| 2005/0071061 | A1 * | 3/2005 | Kato et al. ..................... 701/41 |
| 2009/0026004 | A1 * | 1/2009 | Hidaka et al. ............... 180/446 |

FOREIGN PATENT DOCUMENTS

| JP | 06-127412 | 5/1994 |
| JP | 06-305439 | 11/1994 |
| JP | 2003-040123 | 2/2003 |

OTHER PUBLICATIONS

Japanese Office Action dated Jun. 25, 2009, issued in corresponding Japanese Application No. 2007-201630, with English translation.

* cited by examiner

*Primary Examiner*—Lesley Morris
*Assistant Examiner*—Marlon A Arce
(74) *Attorney, Agent, or Firm*—Nixon & Vanderhye P.C.

(57) ABSTRACT

A steering assisting system has a variable transfer ratio steering apparatus and an electric power steering apparatus. The variable transfer ratio steering apparatus has an electric motor for a rotation transfer ratio varying operation. When a predetermined failure occurs in the electric power steering apparatus, the motor is driven to assist the steering operation of the steering wheel. Therefore, without providing the electric power steering apparatus in two sets, the power-assisting torque generation can be continued even when the electric power steering apparatus fails to generate the power-assisting torque.

6 Claims, 4 Drawing Sheets

STEERING ASSISTING SYSTEM FOR VEHICLE

CROSS REFERENCE TO RELATED APPLICATION

This application is based on and incorporates herein by reference Japanese Patent Application No. 2007-201630 filed on Aug. 2, 2007.

FIELD OF THE INVENTION

The present invention relates to a steering assisting system for assisting a steering operation of a steering wheel in a vehicle.

BACKGROUND OF THE INVENTION

In some conventional steering assisting systems, an electric power steering apparatus or a variable transfer ratio steering apparatus is employed to assist a steering operation of a steering wheel in a vehicle. In other conventional steering systems both the electric power steering apparatus and the variable transfer ratio steering apparatus are employed.

The electric power steering apparatus generates torque for assisting the steering operation of the steering wheel. The variable transfer ratio steering apparatus variably controls a transfer ratio of rotation between a steering angle of the steering wheel and a steered angle of steered wheels (tire wheels).

The electric power steering apparatus and the variable transfer ratio steering apparatus stop respective steering assisting operations, when a predetermined failure occurs therein. For instance, the torque generation operation or the variable transfer ratio control operation may be stopped. The steering operation of the steering wheel by a vehicle driver will not be so influenced by the operation stop of the variable transfer ratio steering apparatus. However, it will be influenced by the operation stop of the electric power steering apparatus, because the steering operation will not be power-assisted.

JP 2003-40123A and U.S. Pat. No. 6,820,715 (JP 2003-200840A) propose improved electric power steering apparatuses, which continue power-assisting operations even when a failure arises at some parts.

In JP 2003-40123A, for instance, a pair of bridge circuits are provided in a motor drive circuit and a pair of coil sets are provided in a brushless motor. Thus, even when a failure occurs in one bridge circuit or one coil set, the other bridge circuit or the other coil set is used in place of the failing bridge circuit or the coil set to continue the power-assisted steering operation. In U.S. Pat. No. 6,820,715, three electric motors operable in parallel and three control circuits operable in parallel are provided. Thus, even when a failure occurs in one motor or one control circuit, another motor or another control circuit is used to continue the power-assisted steering operation. These electric power steering apparatuses need additional set of parts, which cause complicated configuration and high cost.

SUMMARY OF THE INVENTION

It is therefore an object of the present invention to provide a steering assisting system, which includes an electric power steering apparatus and a variable transfer ratio steering apparatus and provides a continued power-assisted steering operation even upon a failure of the electric power steering apparatus.

According to one aspect, a steering assisting system is provided for a vehicle which has a steering wheel and steered wheels steered by the steering wheel. The steering assisting system includes an electric power steering apparatus and a variable transfer ratio steering apparatus. The electric power steering apparatus includes an electric motor for generating torque to assist the steering operation of the steering wheel. The variable transfer ratio steering apparatus includes an electric motor for rotating an output steering shaft operatively coupled with the steered wheels relative to an input steering shaft operatively coupled with the steering wheel. The variable transfer ratio steering apparatus drives the motor to vary a transfer ratio between a steering angle of the steering wheel and a steered angle of the steered wheel. The variable transfer ratio steering apparatus is configured to generate torque to assist the steering operation of the steering wheel upon failure of the electric power steering apparatus.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
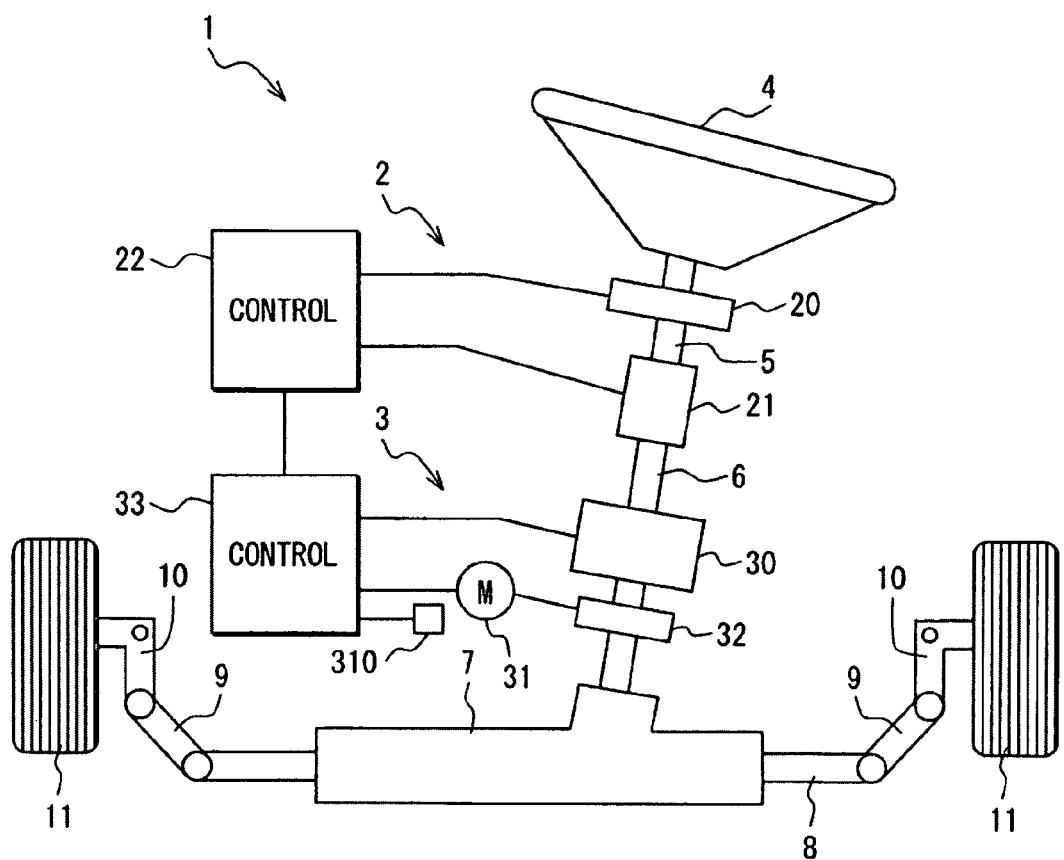
FIG. 1 is a schematic view of a steering assisting system according to an embodiment of the present invention.

Referring to FIG. 1, a steering assisting system 1 is provided for a vehicle, in which a steering wheel 4 is operatively coupled with tire wheels (steered wheels) 11 through an upper steering shaft (steering input shaft) 5, a lower steering shaft (steering output shaft) 6, a steering gear unit 7, a rack 8, tie rods 9 and knuckle arms 10 in the known manner. The steering wheel 4 is fixed to an upper end of the upper steering shaft 5, and the lower steering shaft 6 has a pinion gear (not shown) at its lower end to be engaged with the rack 8 in the steering gear unit 7.

The steering assisting system 1 includes a variable transfer ratio steering apparatus 2 and an electric power steering apparatus 3.

The variable transfer ratio steering apparatus 2 is configured to rotate the lower steering shaft 6 relative to the upper steering shaft 5 thereby to vary a transfer ratio of rotation between a steering angle of the steering wheel 4 and a steered angle of the tire wheels 11. The variable transfer ratio steering apparatus 2 includes a steering angle sensor 20, a transfer ratio varying unit 21 and an electronic control unit 22. The steering angle sensor 20 is attached to the upper steering shaft 5 to detect the steering angle of the steering wheel 4. The transfer ratio varying unit 21 is for rotating the lower steering shaft 6 differently from the upper steering shaft 5.

Figure 2:
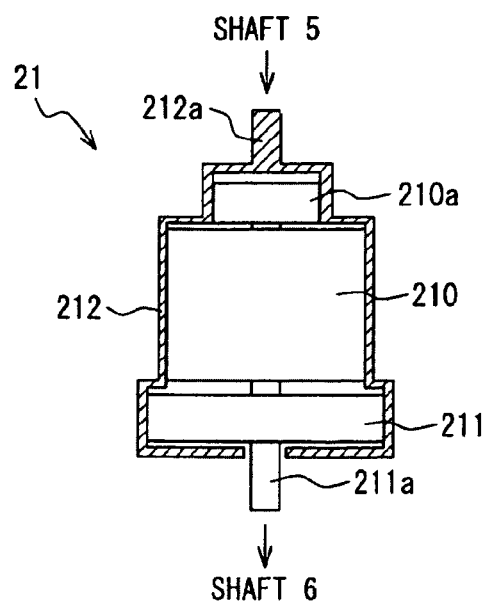
FIG. 2 is a sectional view of a variable transfer ratio steering apparatus employed in the embodiment.

As shown in FIG. 2, the transfer ratio varying unit 21 includes an electric motor 210 and a reduction gear unit 211. The electric motor 210 is a three-phase brushless DC motor, which generates torque for rotating the lower steering shaft 6 relative to the upper steering shaft 5. A rotation angle sensor 210a is attached to the electric motor 210 to detect the rotation position of the electric motor 210. The reduction gear unit 211 is coupled to the output shaft of the electric motor 210. The reduction gear unit 211 is for reducing the rotation of the electric motor 210 and transferring the generated torque to the lower steering shaft 6.

The electric motor 210 and the reduction gear unit 211 are encased within a housing 212. The housing 212 has an input shaft 212a at its upper end to be coupled with the lower end of the upper steering shaft 5. The reduction gear unit 211 has an output shaft 211a, which extends through the bottom of the housing 212 to be coupled with the upper end of the output steering shaft 6.

The control unit 22 is connected to the steering angle sensor 20 and the transfer ratio varying unit 21 for controlling the transfer ratio varying unit 21, specifically, the electric motor 210, based on detection outputs of the steering angle sensor 20 and other sensors such as travel speed sensors (wheel speed sensors).

The electric power steering apparatus 3 includes a torque sensor 30, an electric motor 31, a reduction gear unit 32 and an electronic control unit 33. The electric power steering apparatus 3 is for generating torque to power-assist the steering operation of the steering wheel 4.

The torque sensor 30 is attached to the lower steering shaft 6 to detect the steering torque of the steering wheel 4. The electric motor 31 is a three-phase brushless motor and provided for generating the torque to power-assist the steering operation of the steering wheel 4. The electric motor 31 also includes a rotation angle sensor 310 for detecting its rotation position.

The reduction gear unit 32 is provided between the torque sensor 30 and the steering gear unit 7, that is, opposite to the steering wheel 4 with respect to the torque sensor 30. The electric motor 31 is engaged with the lower steering shaft 6 through the reduction gear unit 32. The reduction gear unit 32 reduces the rotation of the electric motor 31 and transfers the generated torque to the lower steering shaft 6.

The control unit 33 is connected to the torque sensor 30 and the electric motor 31 to control the torque generated by the electric motor 31 based on the detected torque and other detection outputs. The control unit 33 is also connected to the control unit 22 for communication therewith.

Figure 3:
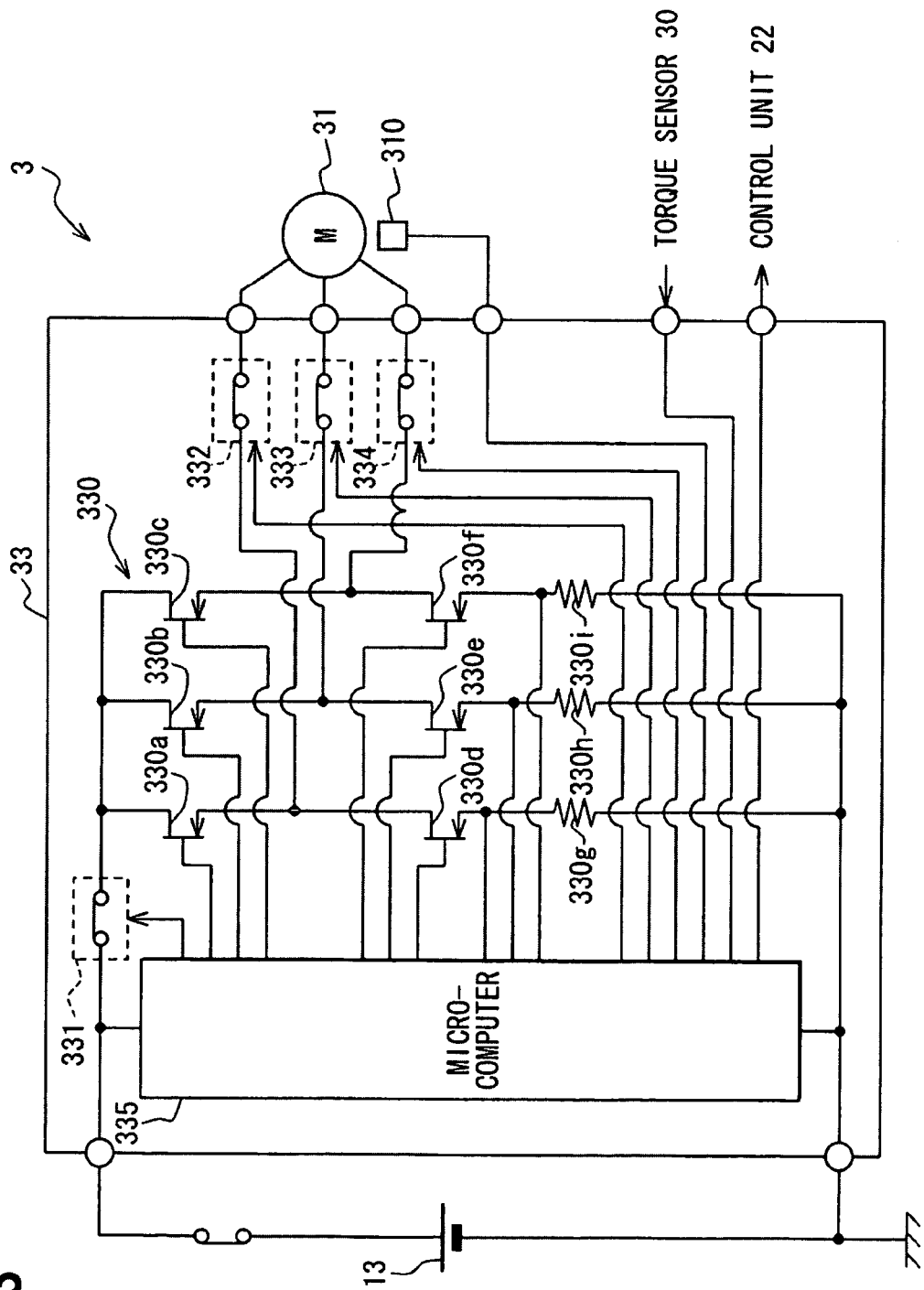
FIG. 3 is a circuit diagram of an electric power steering apparatus employed in the embodiment.

As shown in FIG. 3, the control unit 33 is connected to a storage battery 13 through a switch and includes a power conversion circuit 330, relays 331 to 334 and a control circuit including a microcomputer 335.

The power conversion circuit 330 is an inverter circuit and configured to convert the DC power supplied from the battery 13 to AC power, which is supplied to the electric motor 31. The relay 331 is provided to connect and disconnect the power conversion circuit 330 to and from the battery 13. The relays 332 to 334 are provided between three phase terminals of the power conversion circuit 330 and three phase terminals of the electric motor 31 to connect and disconnect the power conversion circuit 330 and the electric motor 31 phase by phase.

The power conversion circuit 330 includes six MOSFETs 330a to 330f, which are switching devices connected in three-phase bridge form. The drains of the MOSFETs 330a to 330c at the high potential side in the bridge form are connected to the positive terminal of the battery 13 through the relay 331. The sources of the MOSFETs 330d to 330f at the low potential side in the bridge form are connected to the grounded negative terminal of the battery 13 through resistors 330g to 330i, respectively. The resistors 330g to 330i are for detecting phase currents which flow in the electric motor 31, respectively. The gates of the MOSFETs 330a to 330f are connected to the microcomputer 335. The junctions between the MOSFETs 330a and 330d, between the MOSFETs 330b and 330e and between the MOSFETs 330c and 330f are connected to the relays 332 to 334, respectively.

The microcomputer 335 is connected to the battery 13 to operate with the DC power of the battery 13. The microcomputer 335 has signal input terminals connected to the torque sensor 30, the rotation angle sensor 310 and the resistors 330g to 330i. The microcomputer 335 has signal output terminals connected to the gates of the MOSFETs 330a to 330f, the relays 331 to 334, and the control unit 22 of the variable transfer ratio steering apparatus 2.

The microcomputer 335 is programmed to control the power conversion circuit 330 based on the detected steering torque, the detected phase current, the detected rotation angle of the electric motor 31, and the like. The microcomputer 335 is also programmed to monitor operations in the electric power steering apparatus 3, for instance the operation of the power conversion circuit 330, and turn off all the relays 331 to 334 and output a failure signal when any failure is detected.

In operation, the variable transfer ratio steering apparatus 2 and, the electric power steering apparatus 3 start to operate as follows, when the DC power is supplied from the battery 13.

Figure 4:
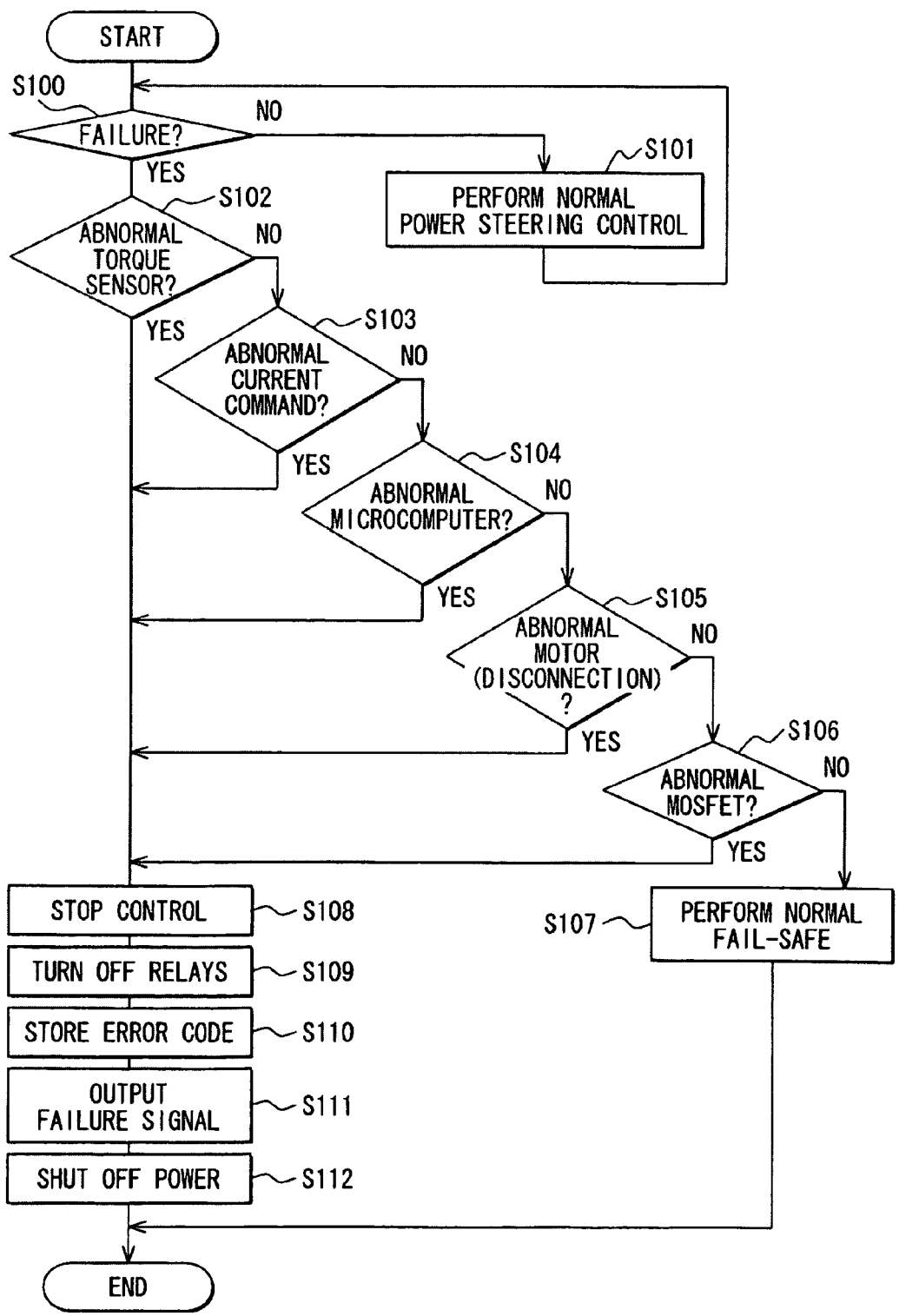
FIG. 4 is a flowchart of processing executed in the electric power steering apparatus.

In the electric power steering apparatus 3, as shown in FIG. 4, the microcomputer 335 first checks at S100 whether there is any failure in the electric power steering apparatus 3. If no failure is determined, the microcomputer 335 performs normal power steering control at S101. In this control, the electric motor 31 is driven to power-assist the steering operation of the steering wheel 4 by controlling the power conversion operation of the power conversion circuit 330 based on the detected steering torque, the wheel speed and the like.

If it is determined at S100 that there is a failure in the electric power steering apparatus 3, the microcomputer 335 then checks whether the failure is a predetermined one by specifying the location of failure at S102 to S106. The microcomputer 335 first checks at S102 whether the failure is in the torque sensor 30, that is, the torque sensor 30 is abnormal. If the torque sensor 30 is not abnormal, the microcomputer 335 checks at S103 whether the failure is in the calculated current command value, that is, the current command value is abnormal. If the current command value is not abnormal, the microcomputer 335 checks at S104, S105 and S106 in sequence whether the microcomputer 335 is abnormal, whether the electric motor 31 is abnormal (coil disconnection, etc.) and whether any MOSFETs 330a to 330f is abnormal, respectively.

If the check results at S102 to S106 indicate that no failure is in the checked parts, the microcomputer 335 determines that the failure determined at S100 is not the predetermined one and will not be so critical or influential in generating the power-assisting torque, and performs only normal fail-safe processing at S107. This normal fail-safe processing may be controlling the power conversion circuit 330 to reduce the phase currents supplied to the electric motor 31 and hence the torque of the electric motor 31 to be lower than in the normal operation performed at S101.

If the failure determined at S100 is the predetermined abnormality in any of the torque sensor 30, the calculated current command value, the microcomputer 335, the electric motor 31 and the MOSFETs 330a to 330f (YES at any one of S102 to S106), the microcomputer 335 determines that the failure is rather critical. In this case, the microcomputer 335 stops the operation of the power conversion circuit 330 (for instance, turn-off of all MOSFETs 330a to 330f) at S108 and turns off (opens) all the relays 331 to 334 at S109. By turning off all the relays 331 to 334, not only the battery 13 and the power conversion circuit 330 is disconnected, but also the power conversion circuit 330 and the electric motor 31 are disconnected. As a result, the electric motor 31 is completely stopped from rotating to generate the power-assisting torque.

The microcomputer 335 then stores at S110 an error code indicative of the determined failure condition, and outputs at S111 a failure signal indicative of the failure in the electric power steering apparatus 3 to the variable transfer ratio steering apparatus 2. The microcomputer 335 finally shuts off the power supply in the apparatus 3, thus completely stopping the operation of the electric power steering apparatus 3.

Figure 5:
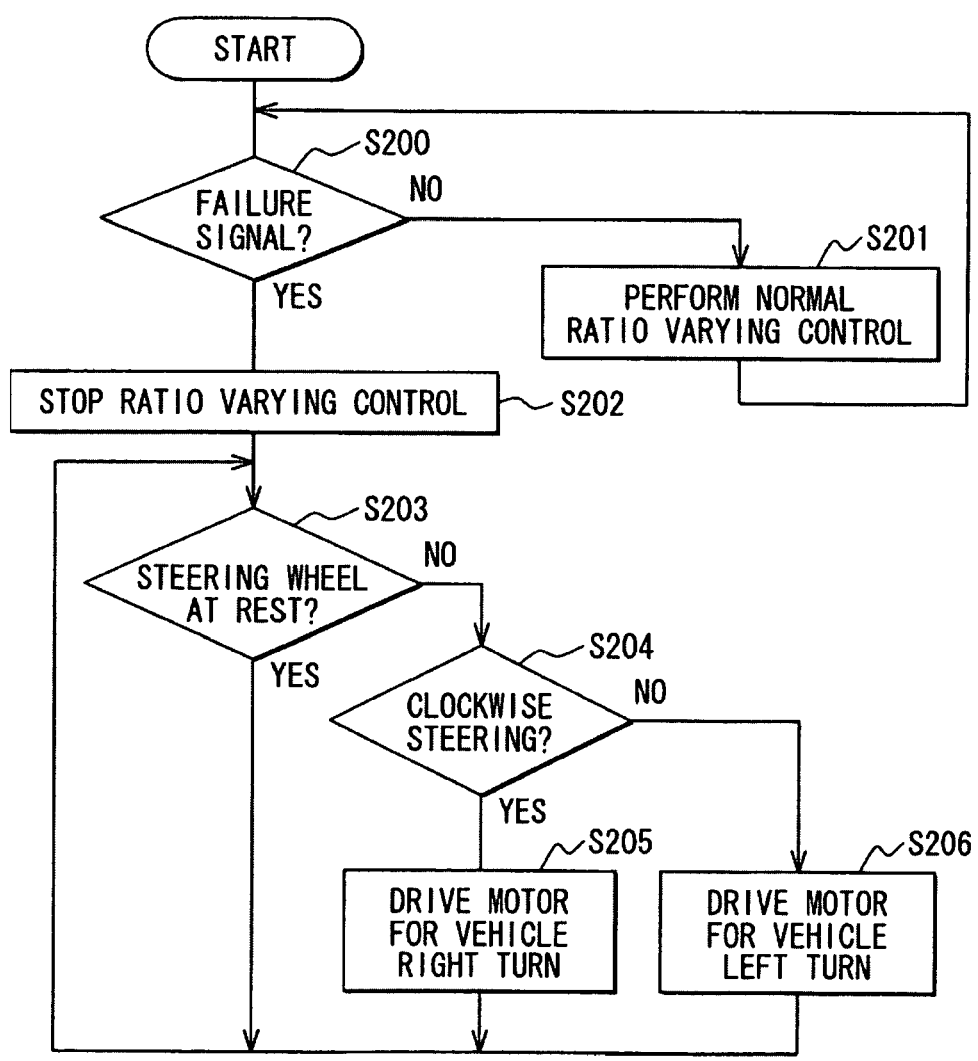
FIG. 5 is a flowchart of processing executed in the variable transfer ratio steering apparatus.

In the variable transfer ratio steering apparatus 2, as shown in FIG. 5, the control unit 22 including a microcomputer (not shown) checks at S200 whether the failure signal is received from the control unit 33 of the electric power steering apparatus 3. If no failure signal is received, the control unit 22 performs normal transfer ratio varying control at S201. In this control, the control unit 22 drives the electric motor 210 to vary the transfer ratio of rotation between the steering angle of the steering wheel 4 (rotation angle of the upper steering shaft 5) and the steered angle of the tire wheels 11 (rotation angle of the lower steering shaft 6).

If it is determined at S200 that the failure signal is received from the control unit 33, the control unit 22 stops the ratio varying control at S202. The control unit 22 then checks at S203 whether the steering wheel 4 is at rest and not being turned. If the steering wheel 4 is at rest, S203 is repeated.

If it is determined at S203 that the steering wheel 4 is being turned, the control unit 22 checks at S204 whether the steering wheel 4 is being turned clockwise (clockwise steering). If the steering wheel 4 is in the clockwise steering, the control unit 22 drives at S205 the electric motor 210 to generate torque for rotating the lower steering shaft 6 in the direction to turn the vehicle (tire wheels 11) in the right direction in correspondence to the rotation of the upper steering shaft 5.

If it is determined at S204 that the steering wheel 4 is not in the clockwise steering but is in the counter-clockwise steering, the control unit 22 drives at S206 the electric motor 210 to generate torque for rotating the lower steering shaft 6 in the direction to turn the vehicle (tire wheels 11) in the left direction in correspondence to the rotation of the upper steering shaft 5.

Thus, the steering operation by the steering wheel 4 is power-assisted by the variable transfer ratio steering apparatus 2, even when the electric power steering apparatus 3 has the predetermined failure and stops its power-assisting operation.

According to the above embodiment, the steering assisting system 1 has the variable transfer ratio steering apparatus 2 and the electric power steering apparatus 3. The variable transfer ratio steering apparatus 2 has the electric motor 210 that rotates the lower steering shaft 6 relative to the upper steering shaft 5. When the predetermined failure occurs in the electric power steering apparatus 3, the electric motor 210 is driven to rotate the lower steering shaft 6 for assisting the steering operation of the steering wheel 4. Therefore, without providing the power steering apparatus 3 in two sets, the power-assisting torque generation can be continued even under the predetermined failure condition of the electric power steering apparatus 3.

Further, when the electric power steering apparatus 3 fails, the control unit 22 operates to rotate the lower steering shaft 6 by the electric motor 210 after stopping the operation of varying the rotation transfer ratio by the electric motor 210. Therefore, the power-assisting torque for the steering wheel 4 can be generated surely.

The direction of steering the steering wheel 4 is determined based on the steering angles detected by the steering angle sensor 20, and the rotation direction of the electric motor 210 is determined by the determined steering direction. Thus, the power assisting torque can be generated in the proper direction corresponding to the steering direction of the steering wheel 4.

Still further, when the electric power steering apparatus 3 fails, it outputs the failure signal to the apparatus 2. Therefore, the variable transfer ratio steering apparatus 2 can surely determine the failure in the electric power steering apparatus 3.

In the above embodiment, although the steering direction of the steering wheel 4 is determined based on the steering angles detected by the steering angle sensor 20, it may be determined based on the torque detected by the torque sensor 30. In addition, the failure of the electric power steering apparatus 3 can be determined by the control unit 22 of the variable transfer ratio steering apparatus 2 without receiving the failure signal from the control unit 33 by monitoring the operations of the electric motor 31 or the like in the electric power steering apparatus 3.

What is claimed is:

1. A steering assisting system for a vehicle having a steering wheel and steered wheels steered by the steering wheel, the steering assisting system comprising:
    an electric power steering apparatus including a first electric motor for generating a torque to assist steering operation of the steering wheel; and
    a variable transfer ratio steering apparatus including a second electric motor for rotating an output steering shaft operatively coupled with the steered wheels relative to an input steering shaft operatively coupled with the steering wheel, the variable transfer ratio steering apparatus driving the second motor to vary a transfer ratio between a steering angle of the steering wheel and a steered angle of the steered wheel,
    wherein the electric power steering apparatus and the variable transfer ratio steering apparatus further include electronic control units, which are provided separately to control the motors of the electric power steering apparatus and the variable ratio steering apparatus, respectively,
    wherein the electronic control unit of the electric power steering apparatus is configured to output a failure signal to the electronic control unit of the variable transfer ratio steering apparatus upon detection of a predetermined failure in the electric power steering apparatus,
    the electronic control unit of the variable transfer ratio steering apparatus is configured to determine, based on the failure signal, that the electric power steering apparatus is in the predetermined failure,
    wherein the electronic control unit of the variable transfer ratio steering apparatus is configured to control the second motor of the variable transfer ratio steering apparatus to generate torque to power-assist the steering operation of the steering wheel only upon the predetermined failure of the electric power steering apparatus.

2. The steering assisting system according to claim 1, wherein the electronic control unit of the variable transfer ratio steering apparatus is configured to stop varying the transfer ratio upon the predetermined failure of the electric power steering apparatus, and drive the second motor of the variable transfer ratio steering apparatus to generate the torque to rotate the output steering shaft in correspondence to rotation of the input steering shaft thereby power-assisting the steering operation of the steering wheel.

3. The steering assisting system according to claim 2, wherein:
the variable transfer ratio steering apparatus includes a steering angle detection means for detecting the steering angle of the steering wheel; and
the electronic control unit of the variable transfer ratio steering apparatus is configured to determine a steering direction of the steering wheel based on the detected steering angle upon the failure of the electric power steering apparatus, and drive the second motor of the variable transfer ratio steering apparatus to generate the torque to rotate the steering output shaft in a direction corresponding to the determined steering direction.

4. The steering assisting system according to claim 2, wherein:
the electric power steering apparatus includes a torque detection means for detecting a steering torque generated by the operation of the steering wheel; and
the electronic control unit of the variable transfer ratio steering apparatus is configured to determine a steering direction based on the detected steering torque upon the predetermined failure of the electric power steering apparatus, and drive the second motor of the variable transfer ratio steering apparatus to generate the torque to rotate the steering output shaft in a direction corresponding to the determined steering direction.

5. The steering assisting system according to claim 1, wherein:
the predetermined failure includes at least one of abnormalities in a detected value of a steering torque of the steering wheel, a current command value to the first motor of the electric power steering apparatus, a microcomputer of the electronic control unit of the electric power steering apparatus, and disconnection of the first motor of the electric power steering apparatus.

6. The steering assisting system according to claim 1, wherein:
the electronic control unit of the variable transfer ratio steering apparatus is configured to drive the second motor of the variable transfer ratio steering apparatus normally, when a failure signal received from the electric power steering apparatus indicates another failure different from the predetermined failure; and
the electronic control unit of the electric power steering apparatus is configured to drive the first motor of the electric power steering apparatus to generate a reduced torque lower than a normal torque, when the another failure is detected.

* * * * *